United States Patent
Bladt

(10) Patent No.: US 7,663,612 B2
(45) Date of Patent: Feb. 16, 2010

(54) METAL DISPLAY PANEL HAVING ONE OR MORE TRANSLUCENT REGIONS

(75) Inventor: Henrik Henriksen Bladt, Vinderup (DK)

(73) Assignee: Bang & Olufsen A/S, Struer (DK)

( * ) Notice: Subject to any disclaimer, the term of this patent is extended or adjusted under 35 U.S.C. 154(b) by 234 days.

(21) Appl. No.: 10/547,015

(22) PCT Filed: Feb. 20, 2004

(86) PCT No.: PCT/DK2004/000113

§ 371 (c)(1),
(2), (4) Date: Aug. 25, 2005

(87) PCT Pub. No.: WO2004/077388

PCT Pub. Date: Sep. 10, 2004

(65) Prior Publication Data
US 2006/0066579 A1      Mar. 30, 2006

(30) Foreign Application Priority Data
Feb. 27, 2003   (DK) ................................. 03/00126

(51) Int. Cl.
G06F 3/042 (2006.01)
(52) U.S. Cl. .................. 345/176; 178/18.01; 178/18.04
(58) Field of Classification Search ................ 345/176, 345/1.1–1.6, 85–108, 156–157, 173–178; 178/18.01–18.09
See application file for complete search history.

(56) References Cited

U.S. PATENT DOCUMENTS

| | | | | |
|---|---|---|---|---|
| 4,613,736 A | * | 9/1986 | Shichijo et al. | 200/317 |
| 5,426,296 A | * | 6/1995 | Shikai et al. | 250/227.2 |
| 5,987,793 A | * | 11/1999 | Ebine | 40/580 |
| 6,355,946 B1 | * | 3/2002 | Ishinaga | 257/98 |
| 6,965,205 B2 | * | 11/2005 | Piepgras et al. | 315/318 |
| 2002/0167704 A1 | * | 11/2002 | Kleinhans et al. | 359/176 |

FOREIGN PATENT DOCUMENTS

| | | |
|---|---|---|
| DE | 19609743 | 9/1997 |
| FR | 2702296 | 9/1994 |
| JP | 7-271309 | 10/1995 |
| JP | 8-202296 | 8/1996 |
| JP | 10-228253 | 8/1998 |
| JP | 2002-23670 | 1/2002 |
| JP | 2002-40952 | 2/2002 |
| WO | WO 03/019505 | 3/2003 |

* cited by examiner

Primary Examiner—Vijay Shankar
(74) Attorney, Agent, or Firm—James Creighton Wray; Meera P. Narasimhan

(57) ABSTRACT

A metal structure (1) has a display region being a second region and being integrate with another region being a first region which is a display region. The metal structure may constitute a monolithic structure of an information display unit, for example, a front panel of an electronic device. The display region is formed by providing a cluster of small non-through-going cavities (5) in the metal structure, leaving a very small thickness of material, the thickness being translucent (6). In addition to being a display unit when arranging a light source behind the translucent region (6), touch sensitive or non-touch sensitive input devices, optionally connected to acoustical input and registration devices, may also be provided. These input devices may advantageously be arranged in, or adjacent, the cavities in the metal structure, whereby when the front of the metal structure is viewed an indication of display or input options is visible.

19 Claims, 6 Drawing Sheets

METAL DISPLAY PANEL HAVING ONE OR MORE TRANSLUCENT REGIONS

This application claims the benefit of PCT Application No. PCT/DK03/00126 filed Feb. 27, 2003 and PCT/DK2004/000113 filed 20 Feb. 2004, which are hereby incorporated by reference in their entirety.

FIELD OF THE INVENTION

The invention relates to a metal structure with one or more translucent regions. The translucent regions may form symbols and thus the metal structure may serve as an information display or input device. Accordingly, the invention also relates to an information display unit and/or input device and/or a combined information display unit and input device incorporating such a metal structure.

BACKGROUND OF THE INVENTION

Display units for providing visual information by applying light from a rear side of a transparent panel with pre-formed symbols are well-known. However, often such displays suffer from a number of disadvantages. It is normally a prerequisite desire of the transparent panels that the information symbols are completely invisible in a deactivated state of the display, i.e. when the light source at the rear side of the display is switched off. Therefore, transparent panels with a semi-transparent rear side or panels made of a semi-transparent material themselves are used as a front of the display so as to give a dark appearance in a deactivated state of the display. Coloured or toned glass or acrylic materials may be used in front of the display to provide this effect.

However, the display region will still be visible to a viewer also in the deactivated state since most often the display will be made of a front material different from the front material of the device to which the display is attached, because often a front panel of a device is a metal panel, thus making it impossible to fully integrate the display unit in the front of the device. The reason for the display panel not being fully integrated with the device front panel is that a transition on the surface between the metal panel of the device and the non-metal panel of the display will always be clearly visible and it will be perceptible if one touches the front surface. If a display panel is attached to a device having a metal front panel the difference in materials will also imply a non-perfect mechanical fit of the display onto or into the front panel of the device. This non-perfect mechanical fit will lead to further disadvantages than non-perfect visual fit as mentioned above. A border edge around the display panel will be inevitable. In addition, attaching a display panel to a front panel of a device will normally involve a penetration of the front panel, such as for electrical wires, thus introducing a path for dust, liquid and gases that may penetrate into the interior of the device thus disturbing the function of the device.

Attempts of producing a display front with an appearance similar to solid metal is known, see for example the earlier application of the applicant WO 03/019505. In this application the formation of a display is described, where translucent regions are created in order to be able to shine light through the metal structure. It thereby becomes possible to display information on the surface of a metal structure where to the user no obvious indications are present that the metal structure serves as a display unit. The document, however, does not describe that the structure may also be used as an input unit, whereby it leaves the serious drawback that for applications, where it is desirable both to display information, but also to receive input, the skilled person will have to provide separate input means, for example in the shape of traditional bottoms, dials, etc. This in turn necessitates that firstly an area of the device where such a structure is built into needs to be larger in order to also accommodate the input means, but also the "pure" design where the surprising effect of having an entire clean metal surface is lost.

In other applications, display fronts which appear to be solid metal have been attempted such as a metal layer being vapour deposited onto a transparent surface thus providing a translucent surface. However, as an example, a glass material must still be used for supporting the metal layer and thereby the visual appearance of an integrated display region and front panel is destroyed. Other attempts to produce displays with metal-like fronts have several layers. Such displays typically have a front sheet of a transparent material positioned in front of a metal sheet thus to a certain degree providing a visual impression of a metal surface.

U.S. Pat. No. 5,987,793 describes a display unit with pre-formed symbols visible from a front side when a light source is applied at a rear side. The display unit has several layers. A transparent sheet forms a front of the display. A 0.01-0.05 µm thick layer of metal, for example aluminium, is applied to the rear side of the transparent sheet. Symbols are formed in a "character cut-out layer" behind the metal layer. The symbols are visible from the front side, when the light source at the rear side is switched on. Without light being switched on at the rear side, only the metal layer is visible from the front side thus giving a visual impression of a metal display. In order to provide a "high-grade feeling" the front side of the transparent panel is coated with a layer of urethane resin.

U.S. Pat. No. 4,417,411 describes a display with a front panel of a transparent material coated with a metal coating with a thickness of 200-300 Å. The metal coating is intended to provide a visual impression of a "metallic wall", when light at the rear side is switched off.

FR 2 702 296 A3 describes a display with a front sheet being translucent but not transparent. A thickness of 0.1-0.5 mm is considered appropriate for the front sheet, depending on which material is used. The front sheet is positioned in front of a second sheet, for example a metal sheet, the second sheet not being transparent or translucent. Transparent symbols are canted into the second sheet so as to allow symbols to be visible from the front when a light source is applied from the rear side.

JP 2002040952 (English abstract) describes a display with a metal film having a large number of small cavities with a pore diameter of 5-70 µm in a specified pitch by about −20-50% area rate of view area is formed on an upper face side of a transparent substrate. A colour image-forming layer is formed on the upper face side of the metal film, and a transparent protective film layer is formed on the upper face of the colour image-forming layer. An effect being obtained with the described display is a "noble metal appearance".

JP 2002023670 describes a display with a metallic film in which small cavities having about 40-70 µm diameter are dispersively arranged at prescribed intervals about 20-50% area rate of the surface area is arranged on the lower face of a transparent display substrate.

It is an object of the present invention to provide a metal structure that can serve as a front panel and at the same time allow information to be displayed on a display region of the panel, when a light source is applied on a rear side of the structure. However, the object includes that when the light source is switched off, the display region should not in any way be distinguishable from the remaining part of the panel.

SUMMARY OF THE INVENTION

The above-mentioned objects are obtained according to a first aspect of the present invention, by providing metal structure with one or more translucent regions, where the unit has a front side suitable for interaction with a user, where said front side is visually homogeneous and a back side opposite the front side, where said one or more translucent regions is/are formed by providing non-through going cavities in the back of the metal structure, leaving a very small thickness of material, said thickness being translucent, and that further means for arranging a light source in the cavity or in the vicinity of the cavity is provided, and that further means for detecting input is provided in the cavity or in the vicinity of the cavity.

By 'translucent' is understood: permitting light to pass through, but diffusing it so that persons, objects etc. on the opposite side are not clearly visible. This is in contrast to 'transparent' which means a substance transmitting rays of light so that objects situated behind can be distinctly seen. An example of a translucent object is frosted window glass.

The thickness mentioned is dependent on the material in question of which the metal structure is made and is dependent on the luminous intensity of the light source and the luminous intensity of the light being transmitted. Accordingly, the thickness of the bottom of the cavity may be as small as 10 nm. Therefore, by a material thickness is understood a spatially averaged thickness of material in a region in question, when viewing the region in a cross-sectional view. For very small thicknesses of material microscopic protrusions of one or both surfaces, between which the thickness is to be measured, may cause the actual thickness to vary considerably throughout a region. For such small thicknesses the type of spatial average adopted in the present invention is spatial average of the region in question with respect to its ability to transmit light with a wavelength in the visible range, e.g. 400-750 nm. Therefore, a region of aluminium having a thickness of perhaps 30 nm according to the present invention has a light transmission corresponding to a sheet of aluminium with a homogeneous thickness of 30 nm. The actual thickness of material of the region may as example vary between 2 nm and 200 nm with a dimensional average thickness of 30 nm. It should be noted that with the thickness definition according to the present invention the determined thickness may depend on the wavelength of light applied. Consequently, comparing two thicknesses is only meaningful if determined for the same type of light, for example monochromatic light with a certain wavelength.

The metal structure according to the first aspect may be monolithic. Preferably the cavities have a light transmission rate of at least 0.1%. Clusters of cavities may be formed. Each of the cavities of the clusters may be substantially cylindrical, and they may have a diameter within the range 1-100 μm. The clusters may form the shape of a symbol and/or may form a matrix of dots.

The metal structure may be selected from the group consisting of: aluminium, magnesium, zinc, titanium, stainless steel alloys, copper, and brass.

The metal structure may further comprise a translucent or transparent protective layer at its front side. The protective layer may be selected from the group consisting of: lacquer, coating, varnish, vitreous enamel, ceramics, oxide, and oxide obtained by anodization.

The metal structure may further comprise a translucent or transparent supporting layer positioned on the rear side of the metal structure. The supporting layer may be selected from the group consisting of: glass, ceramics, polymers, and silicone rubber.

An illuminative display unit comprising a metal structure and a light source, wherein the front side of the metal structure forms a surface for visual display of an image when transilluminated from the rear side by light provided by the light source may also be contemplated within the scope of the present invention. The image may comprise a predefined symbol formed by a shape of the second region of the metal structure. The light source may be positioned on the rear side of the metal structure. The light source may be positioned exterior to the display unit, and the light source may comprise means for guiding light to the rear side of the metal structure into the cavities or in the vicinity of the cavities. The light source may be selected from the group consisting of: glow lights, LEDs, CRTs, and lasers.

The light source may comprise a display screen adapted to form the image to be displayed. The display screen may be selected from the group consisting of: Thin Film Transistor (TFT), Cathode Ray Tube (CRT), Liquid Crystal Display (LCD), Light Emitting Diode (LED), Organic Light Emissive Diode (OLED), Light Emitting Polymer (LEP), Field Emitting Display (FED) and Plasma The display screen may be adapted for forming dynamic images.

In a further advantageous embodiment the means for detecting user-given input commands are touch sensitive, such as for example capacitance elements, piezo-electrical switches, strain gauges, micro-switches, pressure sensitive foils or other suitable devices for detecting touch input.

One of the main advantages with the present invention is the fact that the surface of the device where a display and input unit according to the invention is built into does not appear to have any information means or input devices such as buttons and the like. As the device is activated and the display and input unit is illuminated, a user will be able to see information on the surface of the unit. Furthermore, the unit may be provided with zones which a user may touch in order to give an input such as for example the selection of a radio station, volume control, a number or the like. The touch sensitive means may for example be a capacitance element. Capacitate elements work in the way that a electrical potential is present between two conductive areas. One of these areas might be the surface of the unit and the other conductive area may be arranged inside the cavity. As a user touches an area where the capacitance element is arranged, the electrical potential between the two surfaces will change and thereby make it possible to detect that an input signal has been activated. Another touch sensitive input means may be a so-called piezo-electrical switch where a light pressure on the piezo-electrical switch also generates a current and thereby an input signal. The translucent areas of the cavities are so thin that they might deflect when touched unless a reinforcing means has been arranged inside the cavity. This deflection of the metal layer in the bottom of the cavity may provide input for strain gauges arranged across the bottom of the cavity such that, as the strain gauges are activated and thereby also the electrical current through the strain gauges is changed, an input signal is generated. The same deflection of the metal may be used in order to activate micro switches arranged in the cavities.

Also, a touch-sensitive foil which is commercially available may be arranged in the cavities, such that when a user touches the unbroken surface in designated areas, the pressure will be transmitted through the metal to the touch-sensitive foil. This embodiment is particularly interesting in cases where the touch-sensitive foil is transparent such that it is possible to transmit the light from the light source through the foil, through the cavities and through the translucent sections of the unit. A layer of piezo-electrical crystals can be evaporated onto the cavities to act as a touch sensitive foil. Furthermore, it should be mentioned that other suitable devices, for example originating from nano technology may be implemented in order to detect the touch input for devices of the type described above.

In a still further advantageous embodiment the means for detecting input are not touch-sensitive, such as for example optical means. This embodiment is especially advantageous in use where the surfaces for the display and input unit is part of the surface for an electronic device such as for example a radio, hi-fi, television, oven, cooker, refrigerator and the like, where it is desirable to provide the user with an aesthetically pleasing surface, for example in the form of a brushed aluminium or brushed stainless steel surface. In order to avoid the stains and marks from touching the surface which necessitate cleaning in order to achieve the pleasing surface characteristics and appearance again, the optical means does not require the user to actually touch the unit in order to provide the desired input.

The inventive concept of the present invention as set out above is particularly interesting in an electronic device comprising a display unit according to the invention. The electronic device may be selected from the group consisting of: audio equipment, visual equipment, communication equipment, and auxiliary equipment.

The audio equipment may be selected from the group consisting of: hi-fi equipment, active loudspeakers, Audio-Visual multimedia equipment, portable audio equipment, Car-fi equipment, and In-Car entertainment equipment.

The visual equipment may be selected from the group consisting of: TV sets, computer screens, laptop computer screens, palm computer screens, Audio-Visual multimedia equipment, digital still cameras, motion picture cameras, transportation vehicle instruments, car instrumentation, train instrumentation, aircraft instrumentation, marine vessel instrumentation, and spacecraft instrumentation.

The communication equipment may be selected from the group consisting of: mobile communication equipment, mobile phones, telephones, and radio equipment.

The auxiliary equipment is selected from the group consisting of: electronic watches, domestic appliances, kitchen equipment, food processing machines, medical devices, health care equipment, electronic games, amusement equipment, exercising machines, electronic controlled furniture, home entertainment equipment, measuring equipment, handheld measuring equipment, and remote controls.

The applications above shall not be considered to constitute an exhaustive list of applications. The skilled person and especially a designer will be able to recognise further applications where the inventive features of the invention are advantageous.

In a further application, an input and display unit according to the invention is used as an outer part of a cabinet of an electronic device. The metal structure may form at least a front part of the cabinet.

BRIEF DESCRIPTION OF THE DRAWINGS

In the following, the invention will be described in detail with reference to the accompanying drawing, where FIG. 1 are sketches of the principle of a simple embodiment of the invention, FIG. 2 are sketches of the principle of a preferred embodiment of the invention, FIG. 3 are sketches of the principle of a preferred embodiment of the invention, FIG. 4 are cross-sectional views showing a front panel of a display region with the appearance of a symbol together with a magnified view of a detail of the symbol.

Figure 1:
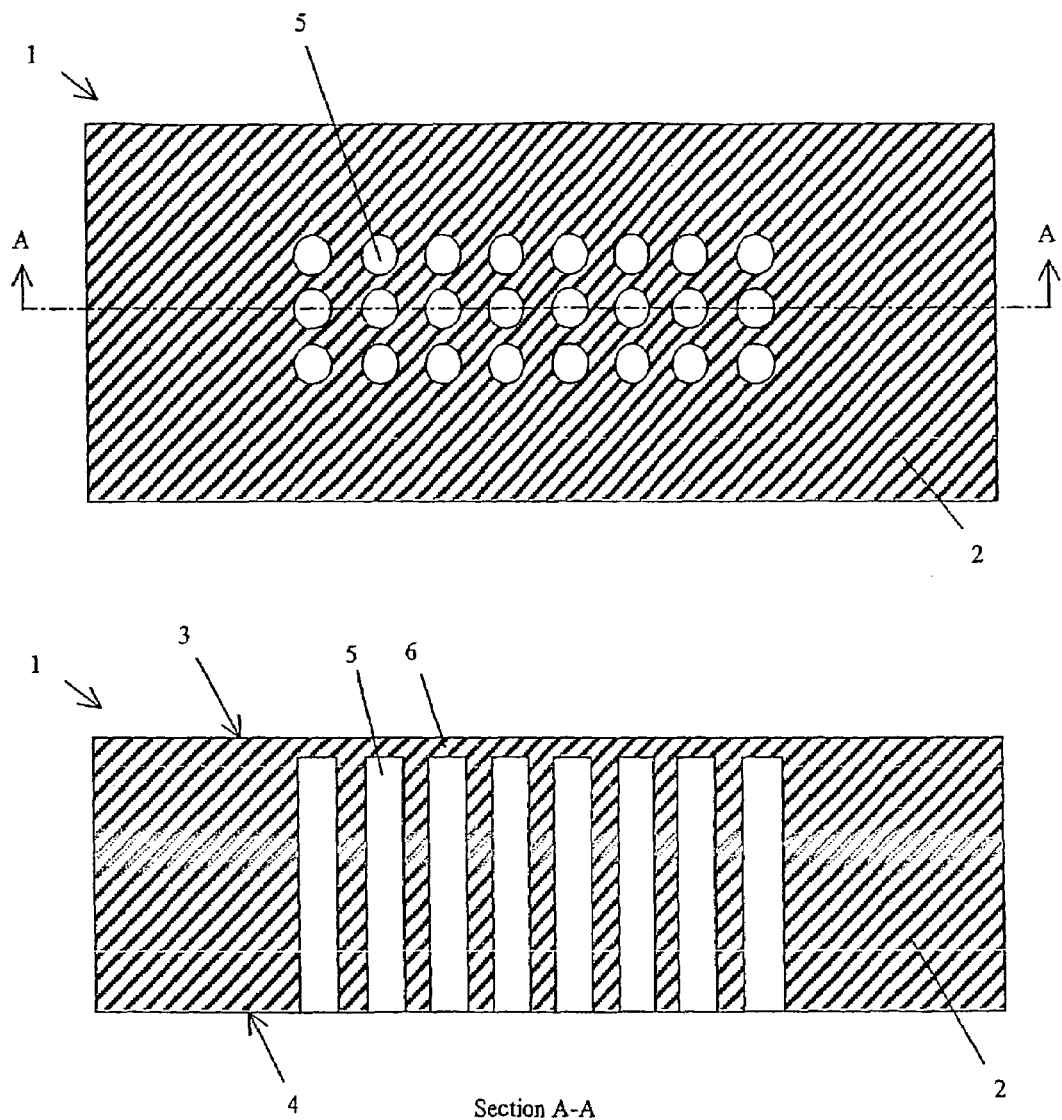

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

The technical effect of the invention is that the metal structure can be used for display of information when viewed from a front side of the metal structure. A display region has shapes so as to form symbols intended for providing a viewer with information when a light source is switched on at a rear side of the metal structure. With the light source switched off, the front side of the metal structure has the appearance of a solid metallic surface—both with respect to visual and touchable appearance and with respect to structural appearance. In the mode where the light is switched off, the appearance is such that no indication is given to a potential user that the input display unit is different from any other metal structure made from the same material. As example, the metal structure may be a plate, a sheet or a foil of aluminium, magnesium, titanium, zinc, brass, stainless steel alloys, copper or the like. Chemically plated metallic surfaces on a metal basement such as chrome on nickel may also be used. In addition, physical vapour deposition (PVD) evaporated metallic coatings such as TiCN, TiAlN, CrN etc. may be used. Metals having a natural hard and stable oxide layer being transparent or translucent are preferred.

According to the invention it is possible to integrate a display in a front of an apparatus, the display being invisible to a viewer in a deactivated state, i.e. when the light source is switched off. The front side of the metal structure may have a polished or brushed surface so as to serve as a front of an apparatus such as TV sets, hi-fi equipment or a large variety of other electronic equipment where, for example, a "clean" homogeneous appearance is desired in a deactivated state, whereas information regarding the function of the equipment is required in an active state, i.e. when the light source is switched on.

FIG. 1 shows a simple embodiment according to the invention. A metal structure 1 being a plate, a sheet or a foil of metal 2 has a front side or surface 3 and a rear side 4. The metal structure 1 has cavities 5 formed in order to produce regions 6, where the metal is thin enough to be translucent so as to allow light to penetrate the metal. The cavities have a very small cross-section, such as ranging from 40 µm to 100 µm for aluminium.

A light transmission rate (degree of transmitted light energy) of the order of 0.1% may be appropriate for some applications. However, a light transmission rate of 1% is preferred in most applications, and a light transmission rate of 10% is even more preferred. In case of aluminium a transmission rate of 0.1% of light with a wavelength of 550 nm (green light) can be expected to be obtained with a material thickness of 35-40 nm. A transmission rate of 1% can be obtained at a thickness of 20-25 nm, and a transmission rate of 5% can be obtained at a thickness of 12-14 nm.

If the light penetrating the metal structure in the regions 6 is visual light, an intensity of light-perceived by the human eye depends to a large degree on the total amount of light being transmitted though the regions, since the cavities are so small that it is not possible for the human eye to see light transmitted through a single cavity. Only closely spaced clusters of cavities can be seen as a symbol displayed by light. Therefore, the visibility of the displayed symbol depends not only on the light transmission rate of each translucent region, but also on the total area of this display region, said total area being the sum of the areas of all cavities within the display region. With a given diameter of the translucent regions an important factor is therefore how close the cavities can be spaced while still not causing the metal structure to be so weak because of to closely spaced cavities that visual defects such as cracks will occur on the surface 3.

The cavities must be so deep that only a translucent thickness of metal is left, but still the remaining material thickness must be sufficiently large so as to maintain a structural integrity of the material and an integrate visual appearance of the front side of the metal structure. If too much material is removed, when forming the cavities, it may result in visible cracks on the front surface thus destroying the visual appearance and the structural integrity. Possibly, a layer of a commonly used metal lacquer or oxide layer on light alloys as anodizing may be applied to the front surface prior to forming the translucent second regions. This layer has a supporting effect on the thin translucent metal layer of the second regions so as to minimise the risk of the cavities causing any cracks or any other visual or structural defects of the front surface.

The cavities formed in the metal material may have any cross-sectional shape. The actual shape may depend on the process for creating the cavity. When for example a laser is used, it may be advantageous to create round cavities (non-through-going cavities), but in other instances when for example an ablation or etching process is used, the cavities will have a random cross-section. When reference therefore is made to the diameter of the cavity, the intended meaning is the mean average diameter.

Figure 2:
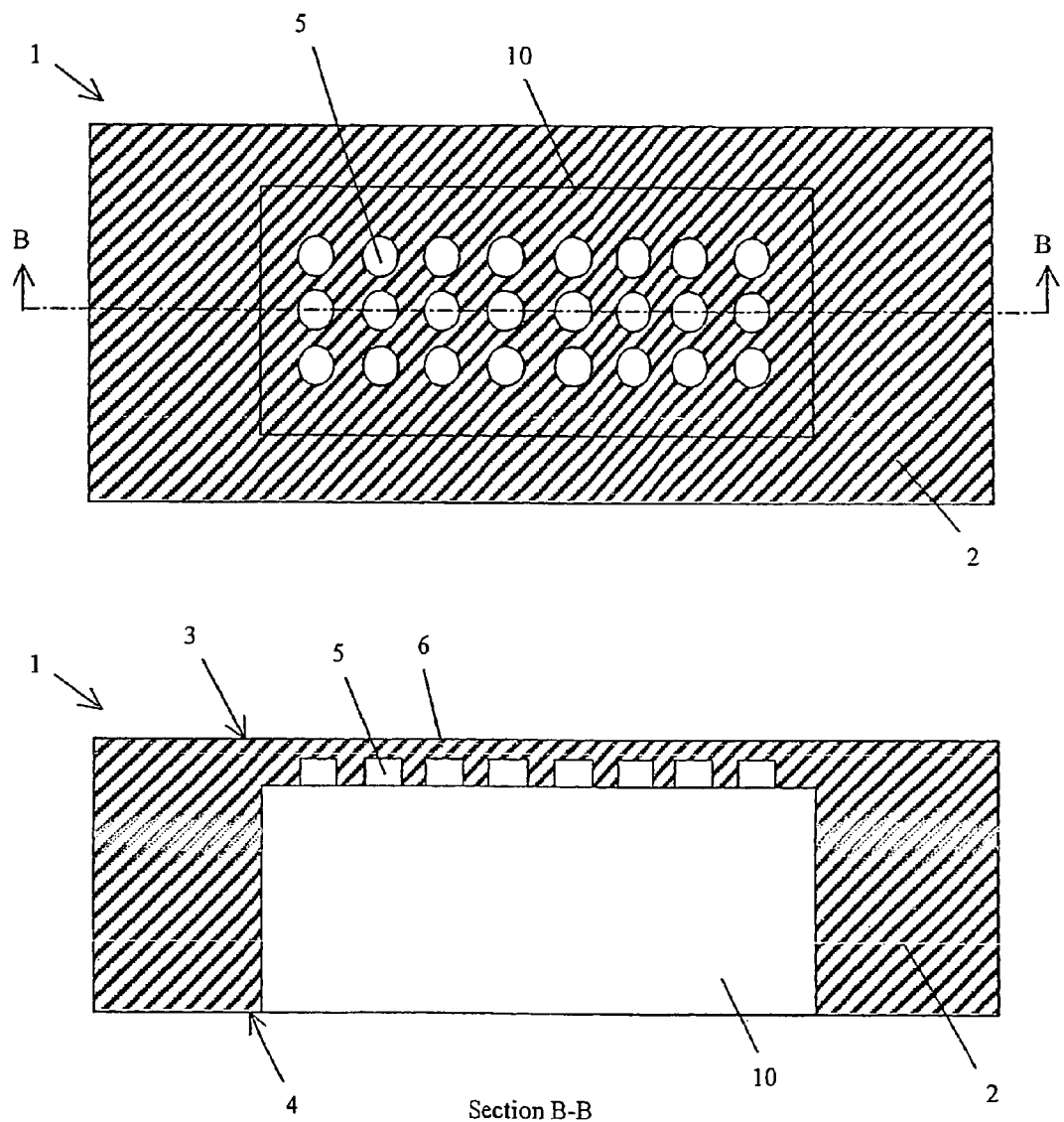

In FIG. 2 is illustrated a further preferred embodiment wherein the cavities 5 are provided at the bottom of a second larger cavity 10. Although the embodiment explained above with reference to FIG. 1 illustrates the inventive principle, it may for practical and economic reasons be advantageous to first create a second larger cavity and thereafter create the small cavities 5.

This embodiment allows for larger light sources to be utilised, closer to the surface 3 of the metal structure 1. Furthermore, the second cavity 10 may be shaped corresponding to the desired display or input sign, desirable on the surface, such that by providing one light source in the second cavity 10 and optionally light diffusing means or lens means the one light source may be utilised for illuminating the desired shape through the cavities 5 and the translucent region 6 on the surface of the structure.

Furthermore the cavities being of such small cross-sections and with very small centre to centre distances, see above requires a very high degree of precision. By creating the second larger cavity 10 the depth of the cavities 5 may be more shallow, whereby it becomes cheaper and easier to provide the necessary precision, in that the actual removal or transformation of material from the cavities is minimised.

Figure 4:
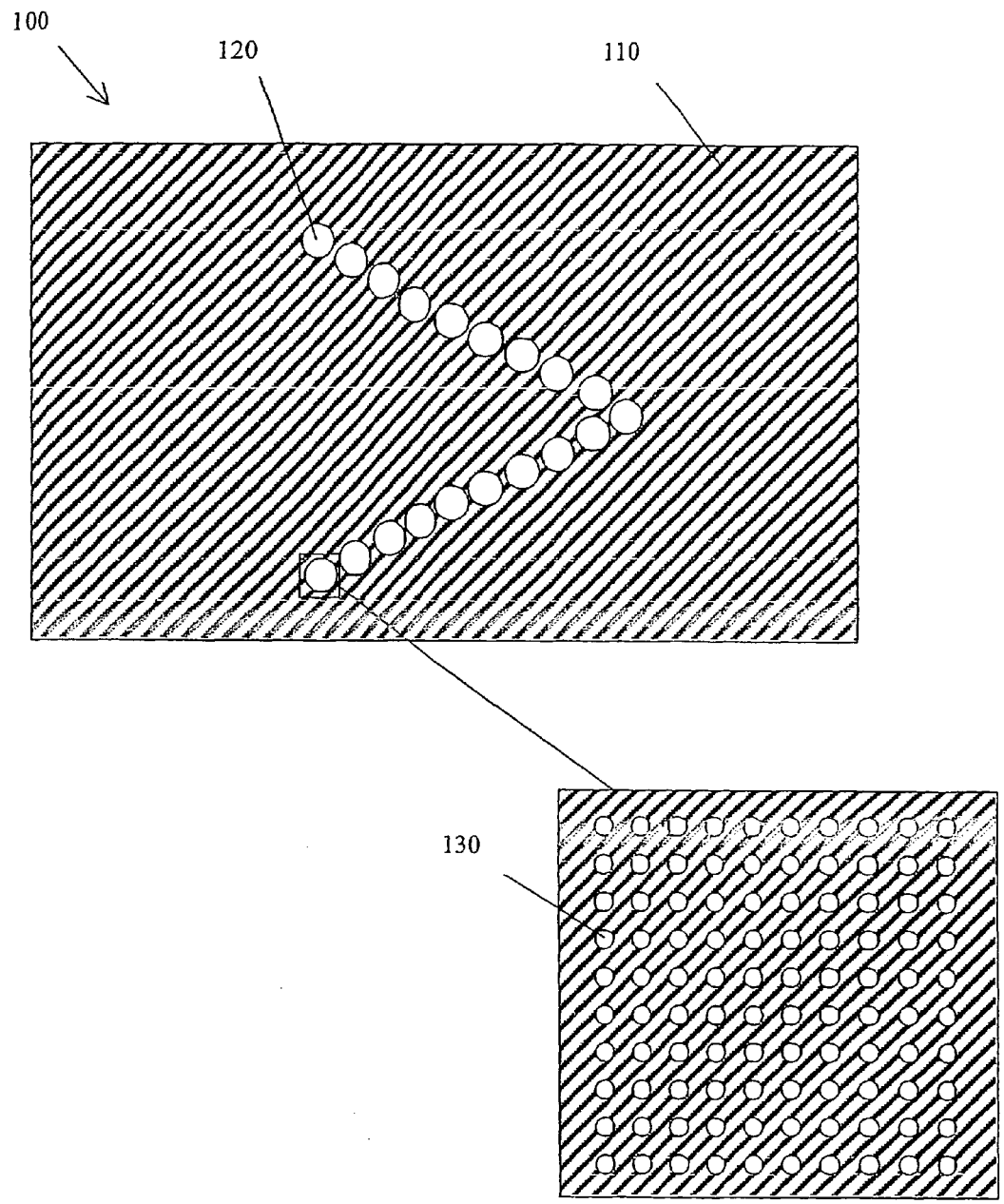

FIG. 4 shows a front view of a display unit 100 formed by a metal sheet capable of displaying the pre-selected symbol '>' on its front surface 110, when a light source positioned at a rear side of the display 100 is switched on. In FIG. 4 the light source is turned on and the shown raster of light dots 120 forming the symbol indicate a visual impression as observed by human eyes. The magnified view shown in the bottom part of FIG. 4 indicates that each visual light dot 120 consists of a cluster of even smaller single translucent dots 130 closely spaced so as to form a visual impression of a single dot 120. In case of an aluminium sheet a suitable thickness of material for providing a translucent region 130 is in the order of 10-30 nm. In aluminium, the cavities may have a diameter in the order of 40 µm and they may be positioned with a centre-to-centre distance of 100 µm. A light transmission rate of 1% or more is possible still without obstructing structural integrity of the surface 110.

In order to enable the very close positioning of cavities with such a small diameter, learning a very small thickness of metal, the cavities should preferably not be too deep. Closely spaced deep cavities require a very high precision with respect to the orientation of the cavities. A centre line of the cavities should be perfectly parallel in order not to merge, thus causing the metal structure to be weaker than if the region between the cavities is kept intact. Therefore, in case of metal plates with a thickness in the order of mm, before preparing the cluster of cavities in a shape forming symbols, it is preferred initially to remove material so as to form a an intermediate region (second region) constituting a cavity on the rear side of the metal plate in a region covering the desired display region. In addition, production time is substantially decreased if an intermediate thickness of material is established prior to the process of forming the translucent regions having the smallest thickness. However, this intermediate thickness should still be sufficient for not causing poor structural stability of the remaining metal structure, such poor structural stability of any such intermediate region resulting in defects on the front surface of the metal structure. The thickness of the second region thus has a thickness being smaller than the first thickness of the entire structure, but larger than the thickness of the material in the bottom of the cavities.

The process chosen for forming a cavity having an intermediate thickness may be chosen according to the type of metal selected. For instance in some materials it may be expedient to use milling, or turning, or grinding, whereas others would work well with the much faster operation of calibrated partial punching, in which the material flows. The forming of the cavity may occur before or after any optional surface texturing (which is to be regarded as separate from surface protection), which may take place by brushing, shot peening, or grinding. The creation of the cavity may be a multi-step process comprising electro-erosion, etching, and a Nd-Yag ablation process FIG. 4 shows a sectional view of a display unit 100 with a surface 110 adapted to display an image formed by a raster of light dots in areas 130, where cavities 135 are formed in the metal structure 105. Note that FIG. 4 shows a principal sketch, the proportions of the features shown are not necessarily correct, i.e. the cavities 135 are shown with exaggerated size.

Figure 5:
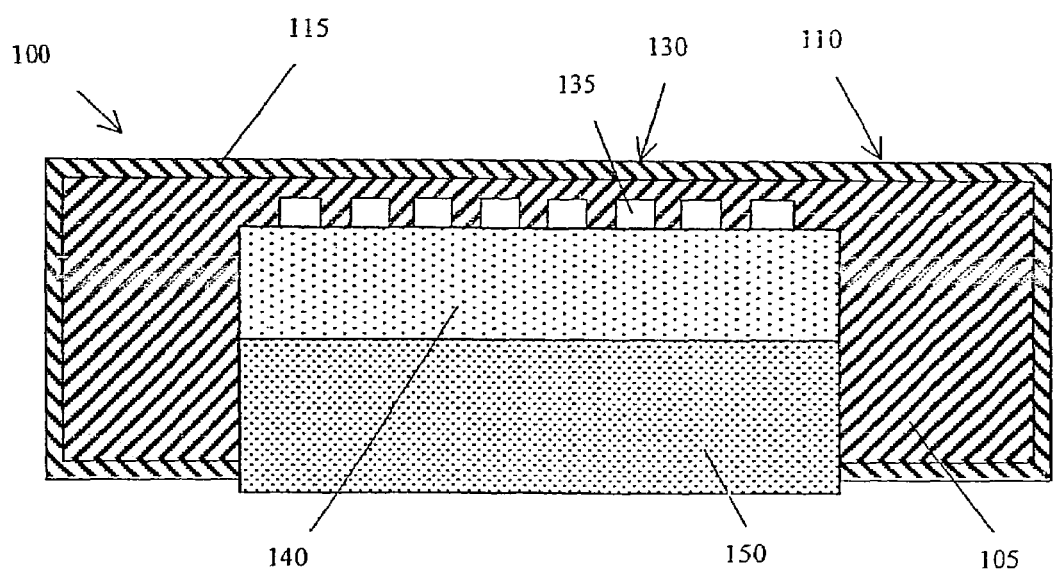
FIG. 5 is a sectional view of a display unit having a protective surface layer, a supporting structure and a light source.

In FIG. 5 the metal structure 105 has a protective layer 115 of anodized oxide or metal lacquer thus providing a surface being resistant to touching of the front side surface 110, resistant to various substances such as deposits from human fingers touching the front side surface 110, and resistant to various objects that accidentally may hit the surface 110. The choice of lacquer, varnish, enamel is well-known for the skilled person. The enamel may be vitreous for alloys and pure metals having a melting point above that of the enamel in question.

In order to further improve the strength of the metal structure, the display 100 is provided with a supporting structure 140 in the area behind the cavities 135 as illustrated in FIG. 5. The supporting structure 140 supports the outer layers 105, 115. The supporting structure is preferably transparent so as to allow a large portion of light provided by the light source 150 to penetrate to the cavities 135 and further to the surface 130. The supporting structure 140 may be a dimensionally stable compound. It may be a polymeric material applied, while in a viscous state, from the rear side of the metal structure. In FIG. 5, the supporting structure 140 is shown not to fill the cavities 135, however it may be preferred to apply a supporting structure 140 of a material that has a viscosity, which when applied will allow the material to fill the cavities 135 as well, thus providing extra strength to the metal structure 105. It is important that the compound neither exhibits shrinkage nor expansion during curing since this would entail changes in appearance of the front surface 110 of the display and, furthermore, that the compound has similar temperature expansion coefficients as the metal material.

The light source 150 sketched in FIG. 5 may be an array of LEDs, such as red, yellow, green, blue or white LEDs or an array of combination of colours. The LEDs may also be adapted to emit light with two different colours such as red or green, thus providing a possibility of a three state display region with the three possible states being: no symbol, red symbol, green symbol. Preferably, the LEDs are types of LEDs providing a bright light so as to allow a light symbol to be visible by the human eye in normal daylight also at a distance of more than 1 m. In FIG. 5 the light source 150 is shown to be positioned adjacent to the supporting structure 140. This may be preferred so the light source 150 can be positioned as close as possible to the surface 110 so as to generate the brightest light possible with a given light source 150. It may also be preferred to position the light source 150 remote to the metal structure 105 and use light guiding, such as optical fibres or an optical lens.

A practical example is as follows: a thin sheet of 10 mm diameter was prepared in a piece of aluminium by turning on a lathe to a thickness of 100 µm. This was subsequently anodized to a thickness of 15 µm of the oxide layer on either side. This semi-product was exposed to the ablative laser treatment according to one aspect of the invention performed at Laser-Laboratorium Göttingen e.V., P.O. Box 2619, D-37016 Göttingen, Germany. A number of square "dots" 1 mm×1 mm were formed in the prepared thin sheet, until a translucency of 0.1% was obtained for each "dot". Each dot consists of a grid of 10×10 essentially cylindrical (but in practice slightly conical) micro cavities each 40 µm in diameter and a centre-to-centre distance of 100 µm. Closer inspection of a cavity displays a slightly edgy cross section. A UV-Excimer femto second laser was used, and a CCD camera was used on the side of the sheet not being treated in order to determine when the appropriate translucency for any one micro cavity had been obtained, whereupon the laser beam was stopped and moved to the next location in the grid. In some cases, the final transparency of individual micro cavity was considerably higher, because of a depletion of aluminium due to surface roughness. However visual inspection of the front of finished articles, even under a microscope (×100 magnification) and angled illumination from the side did not reveal the location of these spots of higher transparency, and they are hence considered to be insignificant in a practical product. A LED was fitted in the cavity on one side of the thin sheet, and the other side—the front—was observed both in daylight and in the dark. The dot pattern was clearly visible as emanating from the solid aluminium surface in a viewing angle of 120°, and in broad daylight a red light was clearly visible at a distance of maximum 3-4 m. A blue diode was less visible, the maximum distance being only 1 m. When the LED was turned off, there was no visible trace of the laser ablation treatment on the front surface which appeared totally uniform, even when a hand-held magnifier was used.

A metal structure according to the present invention has a large number of possible fields of applications on equipment, where it is possible to utilise the metal structure as a structural part of an enclosure, such as a cabinet of an electronic device, and at the same time provide the possibility of presenting information symbols on one or more surfaces of the enclosure. Especially, the metal structure can serve as a front panel, such as a control panel of an electronic device, having a display region being integrate with the remainder, or at least part of the remainder, of the front panel.

A simple application of a combined front panel and display may be a "hidden" stand-by indicator in for example a hi-fi loudspeaker with integrated power amplifier. If not used for a certain period of time a light indicator on the front of the loudspeaker will indicate that the loudspeaker has turned to a stand-by mode. Such a stand-by indicator may according to prior art be implemented as an LED mounted in a cavity through the front panel of the loudspeaker. With the present invention it is possible to avoid a perforation of the front panel, and in an active mode of the loudspeaker the stand-by indicator is invisible. In most embodiments of the invention the display region, when in an activated state, is intended for being visual to the human eye. However, in other embodiments, the display region, or perhaps just part of the display region, may be visible only to optical reading means monitoring and/or controlling functions of the device depending on whether the display region, only being-visible to the optical reading means, is activated or not.

If a front panel has a display function according to the present invention in combination with control means formed as invisible touch sensible zones it is possible to completely avoid any perforation of the front panel. Positions of the touch sensible zones may be indicated by display regions instead of by printed symbols on the surface of the panel. Hereby, it is possible to form a smooth and integrated surface eliminating possible penetration of dust, dirt or liquids that may disturb the function of the equipment behind the front panel. The surface also becomes easy to clean since cleaning or washing of the surface is improved, because of no control means or display means projecting from the surface. An additional possibility is to completely hide control facilities and functions of the device in a deactivated state, where the display function is switched off. In fact it is possible to have a completely blank surface in a deactivated state of the equipment.

According to the present invention it is possible to provide a display unit capable of showing dynamic images, such as motion pictures so as to be able to serve as a screen for a TV set, a computer screen or a screen on a mobile phone. The display unit sketched in FIG. 5 may have cavities arranged so as to form pre-selected symbols such as the display unit shown in FIG. 4. However, according to the invention it is also possible to form symbols by applying light to only selected parts of the second region. The display unit sketched in FIG. 5 may be adapted to show moving pictures if cavities 135 are produced in a cluster forming a raster, for example, a rectangular area corresponding to a screen size. In this way a matrix of cavities 135 will form a translucent area thus allowing any symbol to be formed by applying light to a symbol shaped part of this translucent area. The light source 150 to do this may be a LCD, TFT or CRT colour or monochromatic display screen or any other display screen capable of providing a light intensity required to produce an image with a sufficient light intensity on the surface 110. For certain applications with high demands for a display with a high light intensity the light source 150 may be a LCD display positioned in front of a glow light based lamp. The light source 150 may also be a LED dot-matrix display screen.

Within instrumentation for all types of vehicles a display unit according to the invention may be appreciated. A display for installation in a car may include speedometers, rotation speed meters, fuel tank meters, engine temperature meters, warning lights etc. A "night panel" function is easy to implement where for example only speedometer is permanently illuminated at night, and wherein other instruments are illuminated only when providing relevant information to the driver. In this way a large number of instrumentation lights are avoided thus a disturbing factor due to traffic security is eliminated. Also in daylight it is easy to avoid irrelevant information since the instrumentation can be implemented so that only relevant instruments are visible on the instrumentation panel.

For exterior use within vehicles, such as cars, a flashing indicator can be integrated with the body of the car. Hereby no perforations of the body plates are necessary, thus a potential corrosion factor is eliminated. In addition, a smoother surface without a protruding flashing indicator lamp is beneficial with respect to both wind resistance and with respect to security for pedestrians in case of collision.

When also having the built-in input facilities as discussed below, it becomes possible to use numeric combination car locks, where the input "pad" is part of and integral with the exterior cladding of the car.

A display unit according to the invention may be appreciated for a large number of applications where an apparatus capable of displaying information is combined with a high degree of resistance against dirt and humidity. For example within medical equipment where a display unit according to the invention will be easy to disinfect since the front can be made smooth without any protrusion. In addition, it is possible to use liquids for cleaning/disinfecting without damaging the apparatus into which the display unit is integrated. The resistance to penetration of liquids may also be appreciated within handheld measuring instruments adapted for measurements within humid and dirty places, such as volt meters, sound level meters etc.

The present invention also enables creating of display units and thereby apparatuses with an aesthetic effect since the appearance of an apparatus is not necessarily dictated by technical considerations. This leaves a large degree of freedom to design with respect to aesthetics. It is possible to produce a very "clean" surface if desired, or alternatively the surface can be decorated or formed purely influenced by aesthetics not being limited by technical considerations.

Above the advantages of the invention relating to use as a pure display device have been described. The inventive structure may, however, also be used as a combined display and input unit.

Figure 3:
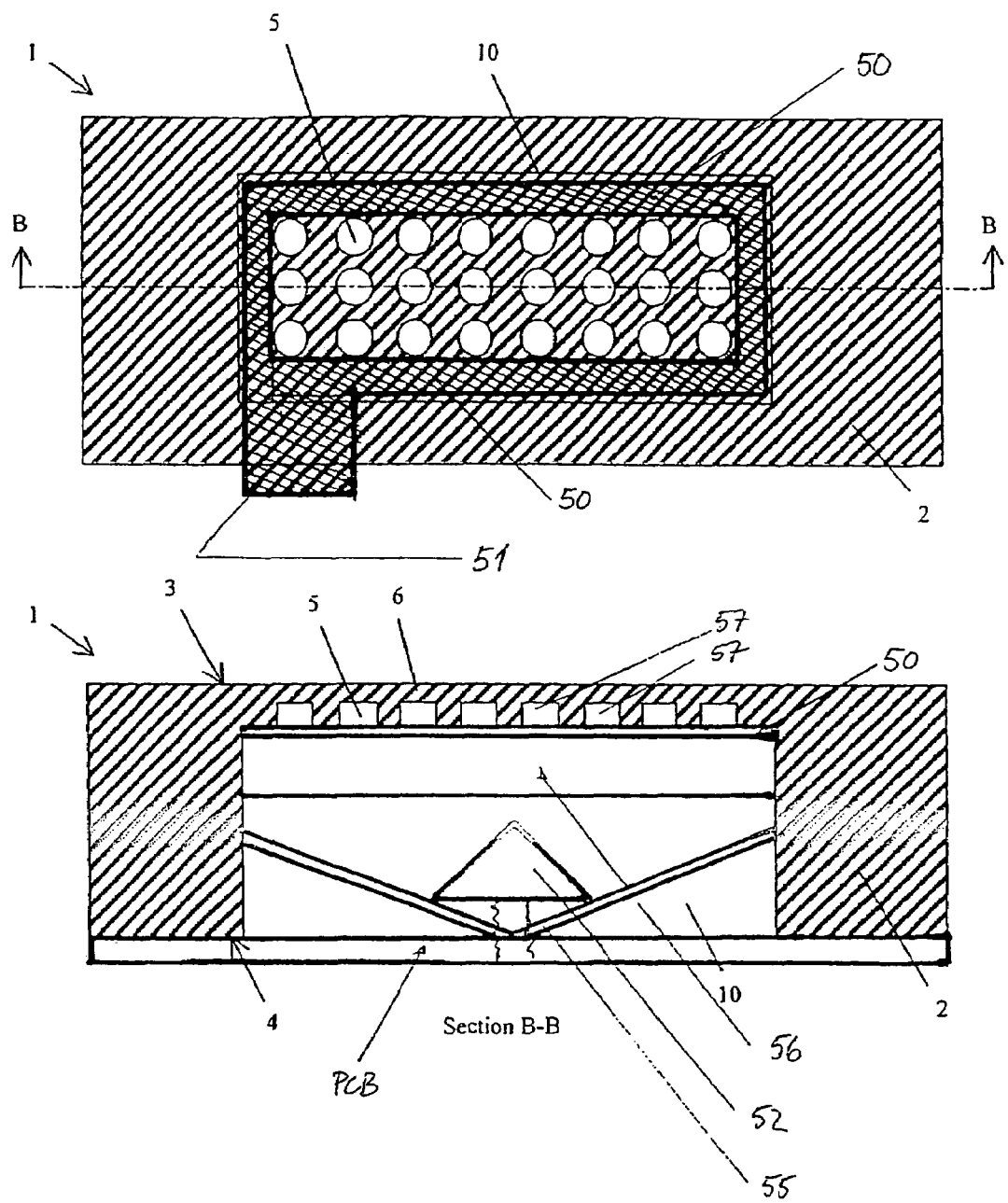

In FIG. 3 is illustrated an example where a number of cavities 5 are formed in a structure 1. The general construction of the metal structure corresponds to the structure described with reference to FIG. 2.

In this embodiment, however, a touch-sensitive foil 50 has been arranged immediately adjacent the openings of the cavities 5. As the surface 3 of the structure 1 is depressed, the depression for example deriving from a user touching the surface 3 will be transmitted to the foil 50, and from the foil via an electrical connection 51 on to appropriate circuitry (not shown) for example arranged on a printed circuit board.

In order to indicate to a user the available option of inputting instructions in the specific region 6 comprising the cavities 5, a suitable display as discussed above should be provided and illuminated such that the translucent properties of the structure are utilised in order to indicate the desired type of information and input options. This may be facilitated by arranging a light source 52 in the second cavity 10. In this connection it should be mentioned that transparent or highly translucent touch sensitive foils 5-o are preferred, as the emitted light from the light source 52 must be able to pass through the foil and the translucent regions 6 of the structure 1.

Optionally, a lens or light diffuser 56 may be arranged between the light source and the foil in order to create and provide an even translucency in the structure and thereby an evenly lighted symbol on the surface 3 of the structure 1.

In order to further improve the light intensity the light source may be provided with light reflector means 55. In practice the light source including reflector means is arranged on a printed circuit board (PCB) and lens as well as touch sensitive foil means is also pre-arranged in relation to the light source in the desired pattern. Before arranging the light in the second cavity 10, the cavities are filled with a preferably transparent filler material, for example an epoxy based resin. In this manner the display means and the input sensor (the touch sensitive foil) are integrated into the reinforcing structure of the second cavity 10.

In use the embodiment as illustrated with reference to FIG. 2, will both display information or input options and register any input made by a user when touching the region 6.

Figure 6:
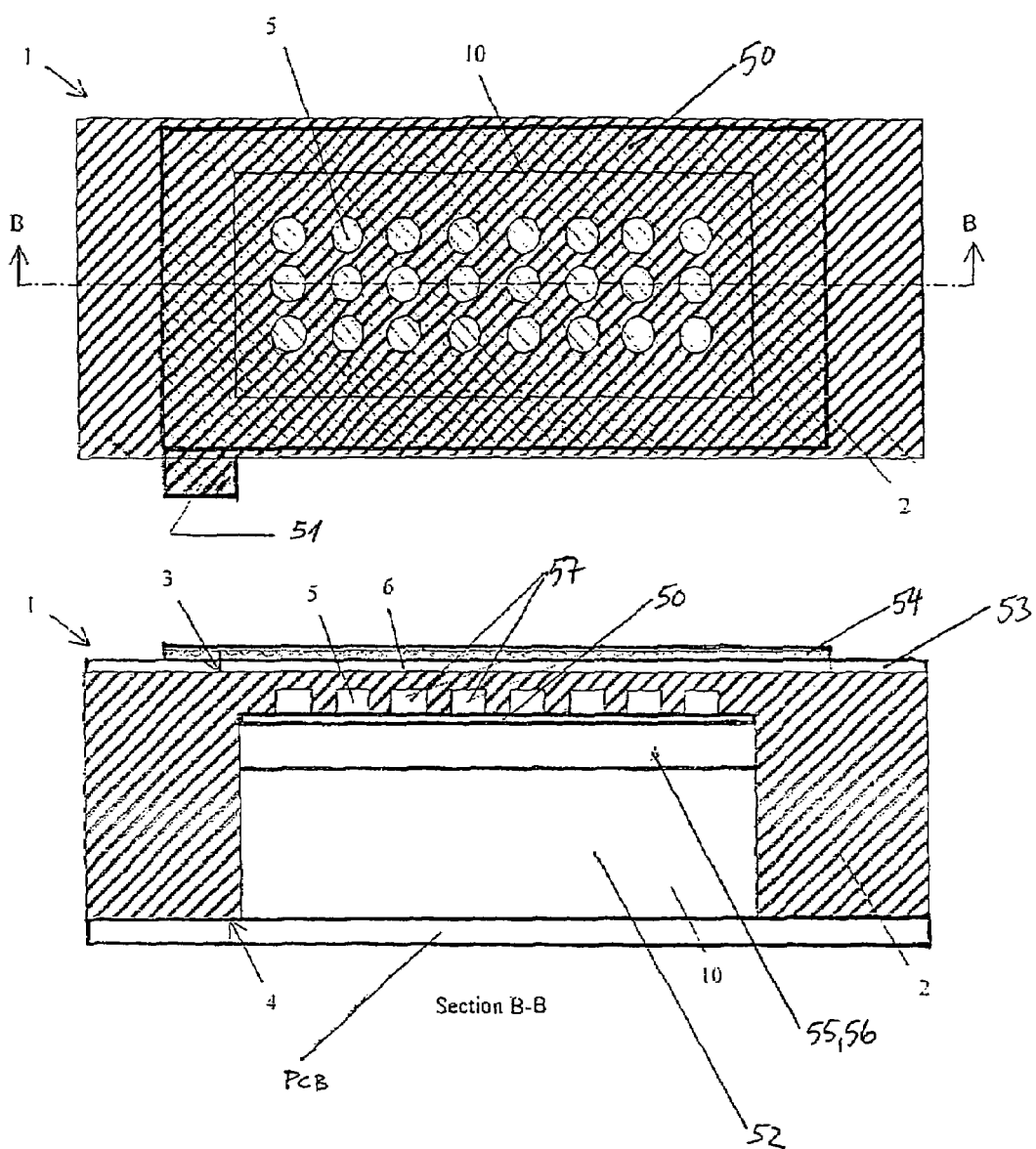
FIG. 6 illustrates a structure where it is both a display and an input unit.

In FIG. 6 is also illustrated an embodiment of the invention where the structure serves both as display and input unit. In this embodiment the input is registered by means of capacitance. The surface 3 of the structure 1 is coated with an isolating layer 53. On top of the isolating layer 53 is arranged a transparent electrically sensitive layer 54 and optionally a transparent protective layer on top.

The light source may be arranged as described above with reference to FIG. 3.

As a user touches the region 6 where the layers 53 and 54 are arranged this will cause a change in capacity in the electrically sensitive layer 54. As was the case in the embodiment described with respect to FIG. 3, this electrical input is detected and transferred to appropriate electronic circuitry (not shown) via electrical connection means 51.

Common for both embodiments illustrated in FIGS. 3 and 6 is that the cavities 5 may be filled with a transparent filler 57. The filler material may be epoxy based, and the material is for example evaporated into the cavities 5. It is important to choose a material with material properties relating to thermal expansion which is substantially corresponding to the corresponding properties of the metal structure 1.

Alternative to the capacitive sense option described in FIG. 6, the input detection may be by means of piezo-electrical or strain-gauge unit principles, as shown in FIG. 3.

An example of a piezo-electrical unit is products such as Algra Dynapic/Dynasim from Algra AG. These piezo-electrical units are relatively small size, and very small depressions of the surface 3 generates voltage which can be detected as an input signal.

Examples of strain gauge units are Force Sensor Resistor from Interlink Electronics Inc. Very small depressions of the surface 3 can be detected as changes in the impedance value of the sensor, which then is detected as an input signal.

In a further embodiment (not illustrated) the display and input unit is designed as a non-touch unit. This is achieved, for example, by arranging the end of an optical fibre in the second cavity 10. The optical fibre is itself the source and sensor as a light detection electronic unit. The input detection is based on breaking the modulated light wave issued from the unit, i.e. the optical fibre, and sensing the reflection. The light may preferably be of infrared wavelength modulated onto a carrier frequency and optionally data coded in order to allow individual address capabilities per fibre or for a group of fibres.

Common for the touch type display and input units contemplated within this invention is that a tactile feed back may be built into the input region, such that a user gets feedback when inputting.

Common for both the touch type and the non-touch type units contemplated within this invention is that an acoustical signal may be issued when the input has been registered. Furthermore a delay may be built into the issuing of the signal, such that it requires that the user for a certain period of time activates the input means. In this manner accidental input may be avoided or at least minimised.

Input may also be varied, such that for example a first brief registering of input, activates a light source and/or an acoustic signal is generated, whereby for example the display is illuminated in the translucent regions, for example as the finger of a user passes the display and input device, a number of acoustical signals may be generated in response to activation of the touch or non-touch sensor means. These signals indicate the regions where a central display or input region is located. The user may thereafter seek and activate the desired information and/or input. In this situation the input registering may be delayed as described above.

Also different types of sensing options may be chosen in one structure, such as touch and non-touch, as well as different means for detecting the input.

I claim:

1. An information display and input unit comprising a metal structure (1) with one or more translucent display regions (6) integrated with a non display region, wherein the metal structure has a front side (3) suitable for interaction with a user, wherein said front side (3) is visually homogeneous, and a back side (4) opposite the front side (3), wherein said one or more translucent display regions (6) is/are formed by providing non-through going cavities (5) extending from the back side partially through the metal structure (1), leaving a very small thickness of material, said small thickness of material being translucent, and that further comprising means for arranging a light source in the cavities (5) or in the vicinity of the cavities (5), and means (50,54) for detecting input is provided in the cavities (5) or in the vicinity of the cavities (5).

2. The unit according to claim 1, wherein the means (50,54) for detecting input are touch sensitive.

3. The unit according to claim 1, wherein the means (50,54) for detecting input are non-touch sensitive.

4. The unit according to claim 1, wherein the means (50,54) for detecting input are connected to acoustical means and/or illumination in the one or more translucent display regions, and registration of input is linked to acoustical signals and/or illuminations in the translucent display regions.

5. The unit according to claim 4, wherein a first acoustical signal and/or illumination in the one or more translucent display regions may indicate that a user is in an input region and a second acoustical signal and/or illumination in the translucent region may indicate that an input has been registered.

6. The unit according to claim 1, wherein a light source (52) is provided, and said light source (52) may comprise reflecting means (55) arranged for directing the light emission towards the one or more translucent display regions (6).

7. The unit according to claim 3, wherein the light source (52) is one or more optical fibres mounted in structures in the vicinity of one or more cavities (5), and further wherein the fibres are connected to a light detection electronic circuit, such that alterations in the emitted light is recognised as an input.

8. The unit according to claim 1, wherein one or more cavities (5) may be arranged in a secondary cavity (10), wherein a cross-sectional area of the secondary cavity (10) is substantially larger than a cross-sectional area of the one or more cavities (5).

9. The unit according to claim 8, further comprising an information display and input unit comprising the metal structure (1) with the one or more translucent display regions (6), wherein the unit has a front side (3) suitable for interaction with a user, where said front side (3) is visually homogeneous and a back side (4) opposite the front side (3), where said one or more translucent display regions (6) is/are formed by providing non-through going cavities (5) in the back of the metal structure (1), leaving a very small thickness of material, said small thickness being translucent, further means for arranging a light source in the cavities (5) or in the vicinity of the cavities (5) is provided, and means (50,54) for detecting input is provided in the cavities (5) or in the vicinity of the cavities (5) arranged in the secondary cavity (10).

10. The unit of claim 8, wherein the cavities inside the secondary cavity are filled with a transparent filler (57).

11. The unit of claim 10, wherein the transparent filler is an epoxy based filler.

12. The unit of claim 6, wherein a light diffuser and/or lens (56) is arranged between the light source (52) and the one or more translucent display regions (6).

13. An information display and input unit comprising a metal structure with one or more translucent regions, wherein the metal structure has a front side and a back side opposite the front side, wherein the front side is suitable for interaction with a user, wherein said front side is visually homogeneous, wherein said one or more translucent regions are created by providing cavities from the back side of the metal structure terminating short of the front side, such that a material thickness in the ends of the cavities is translucent through the metal structure that remains at the ends of the cavities, light sources in the cavities or in the vicinity of the cavities, and input detectors provided in the cavities or in the vicinity of the cavities for detecting inputs from, on or near the ends of the cavities.

14. The unit of claim 13, wherein the metal structure has a first region which is not a display region, wherein the cavities are formed in a second region of the metal structure which is a display region, and wherein the first and second regions are integrated.

15. The unit of claim 2, wherein the means (50,54) for detecting input that are touch sensitive are devices selected from the group consisting of capacitance elements, piezo-electrical switches, strain gauges, micro-switches, pressure sensitive foils, and combinations thereof.

16. The unit of claim 3, wherein the means (50,54) for detecting input that are non-touch sensitive are optical means.

17. The unit of claim 7, wherein the alterations in the emitted light are reflections.

18. The unit of claim 7, wherein the alterations in the emitted light are variations in wave patterns.

19. The unit of claim 7, wherein the alterations in the emitted light are modulations in wave patterns.

* * * * *